US012789228B2

(12) United States Patent
Minnick et al.

(10) Patent No.: US 12,789,228 B2
(45) Date of Patent: Nov. 10, 2026

(54) COATED MEDICAMENT CANNISTER

(71) Applicant: Biomerics LLC, Salt Lake City, UT (US)

(72) Inventors: Mark A. Minnick, McGaheysville, VA (US); Darrel A. Scott, Mount Sidney, VA (US); Randall W. Churchill, McGaheysville, VA (US)

(73) Assignee: Biomerics LLC, Salt Lake City, UT (US)

( * ) Notice: Subject to any disclaimer, the term of this patent is extended or adjusted under 35 U.S.C. 154(b) by 0 days.

(21) Appl. No.: 18/869,677

(22) PCT Filed: May 15, 2023

(86) PCT No.: PCT/IB2023/054986
§ 371 (c)(1),
(2) Date: Nov. 26, 2024

(87) PCT Pub. No.: WO2023/228000
PCT Pub. Date: Nov. 30, 2023

(65) Prior Publication Data

US 2025/0367699 A1 Dec. 4, 2025

Related U.S. Application Data

(60) Provisional application No. 63/412,985, filed on Oct. 4, 2022, provisional application No. 63/346,691, filed on May 27, 2022.

(51) Int. Cl.
*B05D 3/02* (2006.01)
*A61J 1/14* (2023.01)
*B05B 13/06* (2006.01)

(52) U.S. Cl.
CPC .......... *B05D 3/0272* (2013.01); *A61J 1/1468* (2015.05); *B05B 13/0672* (2013.01); *B05B 13/0681* (2013.01)

(58) Field of Classification Search
None
See application file for complete search history.

(56) References Cited

U.S. PATENT DOCUMENTS

2010/0282248 A1* 11/2010 Schutte .................. C03C 17/22
128/200.23
2020/0277129 A1* 9/2020 Schoebben ........... A23B 2/758

FOREIGN PATENT DOCUMENTS

EP 2227227 B1 * 7/2015 ................ C08F 8/44
EP 2227230 B1 1/2017

(Continued)

OTHER PUBLICATIONS

European Patent Office; Communication under Rule 71(3) EPC issued for European Patent Application No. 23730582.6 dated Jan. 14, 2026; 38 pages.

(Continued)

*Primary Examiner* — Michael P. Rodriguez
(74) *Attorney, Agent, or Firm* — Womble Bond Dickinson (US) LLP

(57) ABSTRACT

A method of preparing a medicament canister may include providing a canister (102) having a base wall (104), an open end (108) opposite the base wall, a side wall (106) extending between the base wall and the open end, and an interior surface defined by the base wall and the side wall. The side wall may include a neck portion (114) extending around the open end. The canister may be composed of a metal material. The method may include heating an oven to a temperature between about 290° C. and about 300° C., annealing the canister in the heated oven to burn off residue from the interior surface of the canister, applying a layer of a polyester coating to the interior surface of the canister, exposing the canister to a first temperature to dry the polyester coating, and exposing the canister to a second temperature to cure the polyester coating.

10 Claims, 9 Drawing Sheets

(56) References Cited

FOREIGN PATENT DOCUMENTS

| | | | |
|---|---|---|---|
| EP | 3756711 | A1 | 12/2020 |
| JP | 2007246603 | A | 9/2007 |

OTHER PUBLICATIONS

European Patent Office; International Search Report and Written Opinion issued for PCT/IB2023/054986; Aug. 20, 2023; 20 pages.
European Patent Office; Communication under Rule 71(3) EPC Intention to Grant; dated Jul. 16, 2026; 68 pages.

* cited by examiner

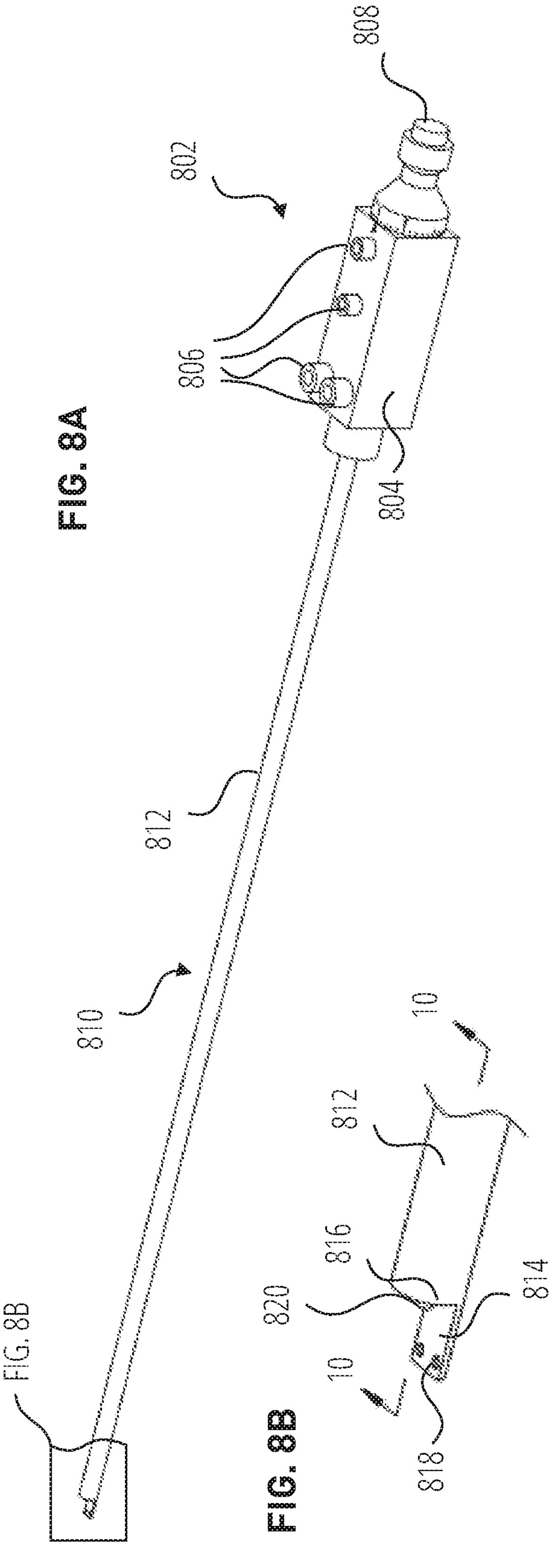
FIG. 8A
FIG. 8B
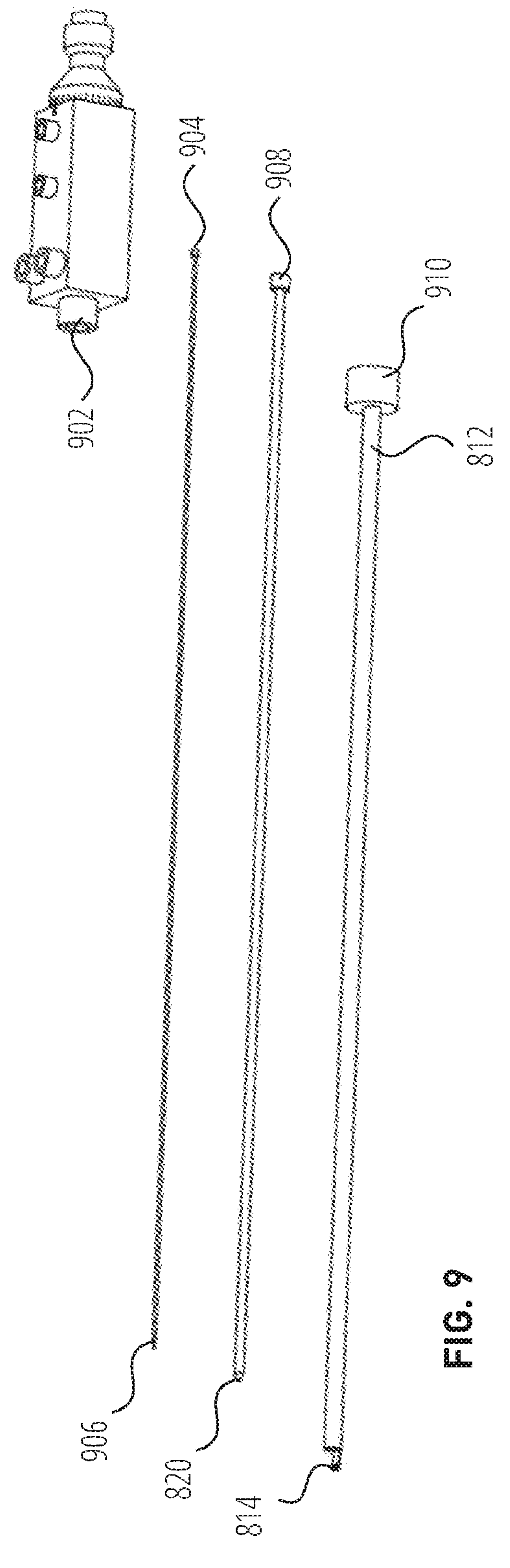
FIG. 9

COATED MEDICAMENT CANNISTER

CROSS-REFERENCE TO RELATED APPLICATIONS

This application is a National Stage of International Application No. PCT/IB2023/054986, filed May 15, 2023, which claims priority to U.S. Provisional Application No. 63/346,691, filed May 27, 2022, both of which are hereby incorporated by reference in their entireties.

BACKGROUND

Inhaled medication may be delivered to a patient through the use of devices including metered-dose inhaler (MDI), metered-dose inhaler with spacer/holding chamber, dry powder devices, soft-mist devices, and nebulizers. The deposition of the content of drug formulation on the interior of an inhaler cannister/canister surface, which may be an aluminum substrate, can result in a shorter shelf life of an MDI inhaler. Applying a suitable surface coating to the interior surface of the canister helps to extend this shelf life, and also helps ensure that the drug formulation does not stick to the interior wall of the inhaler canister so that the patient can receive the prescribed dose of medication.

Over the years, a range of coating processes have been developed that can be applied to both the canister and valve of MDIs to protect the contents from deposition and degradation. However, these processes often involve coating compositions that are harmful to the environment, or require use of metal canister formed from substrates that are more expensive to manufacture, increasing costs of the product. Accordingly, it may be desirable to develop a process for coating an interior surface of a canister formed from a metal substrate using a polyester coating, which is considered an alternative to known harmful coating compositions in use today.

As discussed herein, surface coating of an interior surface of a medicament canister may be done to prevent degradation of a MDI medicament canister as a result of contact with the contents of the canister (e.g., medications, propellants, solvents, etc.). Fluoropolymers such as fluorocarbon polymers (e.g., Teflon) have traditionally been used for coatings, however, the production and use of these compounds are increasingly subject to restrictions and bans, resulting in a need for a replacement coating composition. Accordingly, testing and development of a method of applying a polyester coating may provide an alternative to known fluoropolymer coatings in the context of MDI canister coatings.

Methods of applying coatings of various compositions to unfinished canisters (e.g., metal sheets that are formed into the final canister product after the coating is applied, partially formed canisters that are finished after the coating is applied) have been suggested. Furthermore, methods of applying and curing an aqueous polyester coating have been suggested. However, such methods have increased risk of damaging the coating by forming the final canister product after application, and higher temperatures required to dry aqueous coatings may result in less efficient and more costly manufacturing processes, as well as a greater potential for the coating to dry improperly or burn due to overheating.

In view of the above disadvantages with medicament canisters, there is a need for a medicament canister incorporating a protective interior surface coating that does not contain known hazardous chemicals including fluoropoyler coatings. There is a further need for a coating processes for a medicament canister that provides reliable coating adhesion for coating compositions including solvent-based polyester coatings.

According to an aspect, the exemplary embodiments include a method of preparing a medicament canister. The method may include providing a canister having a base wall, an open end opposite the base wall, a side wall extending between the base wall and the open end, and an interior surface defined by the base wall and the side wall. The side wall may include a neck portion extending around the open end, and the canister may be composed of a metal material. The method may further include heating an oven to a temperature between about 290° C. and about 300° C. and annealing the canister in the heated oven for between about 4 minutes to about 4 minutes and 30 seconds to burn off residue from the interior surface of the canister. The method may further include applying a layer of a polyester coating to the interior surface of the canister, exposing the canister to a first temperature to dry the polyester coating, and exposing the canister to a second temperature to cure the polyester coating.

In another aspect, the exemplary embodiments include a method of preparing a medicament canister, including providing a canister having a base wall, an open end opposite the base wall, and a side wall extending between the base wall and the open end, and an interior surface defined by the base wall and the side wall. The side wall may include a neck portion extending around the open end. The canister may be composed of a metal material. The method may further include washing the canister to remove residue from the canister, applying a layer of coating to the interior surface of the canister. According to an aspect, the layer of coating includes a solvent-based polyester coating. The method further includes passing the canister through an oven having a drying chamber set to a temperature of about 205° C. to about 215° C. and a curing chamber set to a temperature of about 245° C. to about 255° C.

In a further aspect, the exemplary embodiments include a method of coating an interior surface of a pre-formed canister having a neck portion. The method may include inserting a spray gun nozzle through an open end and neck portion of the canister and into an interior of the canister. According to an aspect, the interior of the canister is defined by a base wall opposite the open end, and a side wall extending from the neck portion of the canister to the base wall. The method further includes spraying a first layer of a solvent-based polyester coating onto an interior surface of the base wall of the canister, spraying a second layer of the solvent-based polyester coating onto an interior surface of the neck portion and at least a portion of an interior surface of the side wall of the canister, and spraying a third layer of the solvent-based polyester coating on an entire interior surface of the canister. The method may further include drying the canister and curing the first, second, and third layers of the solvent-based polyester coating.

BRIEF DESCRIPTION OF THE SEVERAL VIEWS OF THE DRAWINGS

A more particular description will be rendered by reference to exemplary embodiments that are illustrated in the accompanying figures. Understanding that these drawings depict exemplary embodiments and do not limit the scope of this disclosure, the exemplary embodiments will be described and explained with additional specificity and detail through the use of the accompanying drawings in which:

FIG. 8A is a perspective view of a spray gun, according to an exemplary embodiment;

FIG. 8B is a detail view of the spray gun nozzle of FIG. 8A, according to an exemplary embodiment;

FIG. 9 is an exploded view of a spray gun nozzle, according to an exemplary embodiment;

Figure 1:
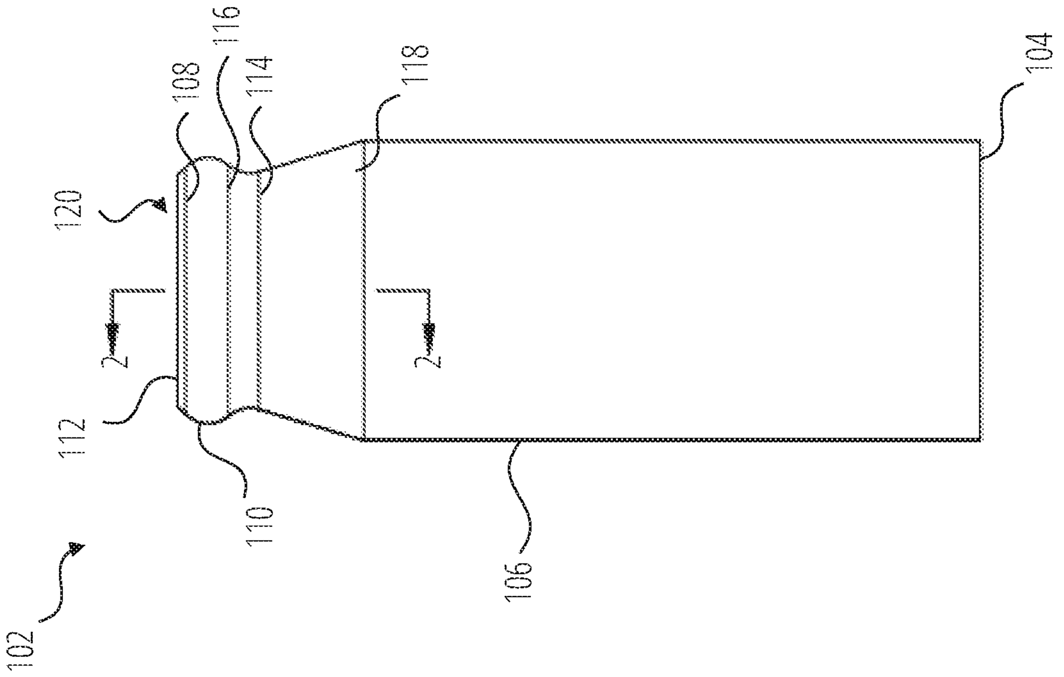
FIG. 1 is a plan view of a coated medicament canister prepared with a polyester spray coating process, according to an exemplary embodiment.

Various features, aspects, and advantages of the exemplary embodiments will become more apparent from the following detailed description, along with the accompanying drawings in which like numerals represent like components throughout the figures and detailed description. The various described features are not necessarily drawn to scale in the drawings but are drawn to aid in understanding the features of the exemplary embodiments.

The headings used herein are for organizational purposes only and are not meant to limit the scope of the disclosure or the claims. To facilitate understanding, reference numerals have been used, where possible, to designate like elements common to the figures.

DETAILED DESCRIPTION

Reference will now be made in detail to various exemplary embodiments. Each example is provided by way of explanation and is not meant as a limitation and does not constitute a definition of all possible embodiments. It is understood that reference to a particular "exemplary embodiment" of, e.g., a structure, assembly, component, configuration, method, etc. includes exemplary embodiments of, e.g., the associated features, subcomponents, method steps, etc. forming a part of the "exemplary embodiment."

FIG. 1 shows an exemplary embodiment of a medicament canister 102 that may be used for storage and aerosol delivery of medical treatments, e.g., for asthma and COPD therapies. The medicament canister 102 may include a base wall 104 and a side wall 106 extending from the base wall 104. The side wall 106 may terminate at an open end 108 provided away from the base wall 104. The open end 108 may be defined by a rim portion 110 formed along an edge 112 of the side wall 106. A neck portion 114 may be provided along the side wall 106 between the rim portion 110 and the base wall 104. In an aspect, a first contour 116 may be provided between the rim portion 110 and the neck portion 114, and a second contour 118 may be provided adjacent the neck portion 114 between the neck portion 114 and the base wall 104. The first contour 116 and the second contour 118 may be portions of the medicament canister 102 that have a smaller or larger circumference relative to the portion of the medicament canister 102 immediately adjacent thereto. For example, the first contour 116 may be defined as a portion of the medicament canister 102 having a smaller circumference relative to the rim portion 110 and the neck portion 114. The second contour 118 may be defined as a portion of the medicament canister 102 having a smaller circumference relative to the side wall 106 and a larger circumference relative to the neck portion 114. The second contour 118 may taper towards the neck portion 114. The medicament canister 102 may include an open interior 120 defined by the base wall 104 and the side wall 106. The open interior 120 may be particularly suited for being filled with medications, propellants, solvents, and the like for delivery of the medication to the user. A coating may be applied to an inner surface of the medicament canister 102 (i.e., to an inner surface of the rim portion 110, the first contour 116, the neck portion 114, the second contour 118, the side wall 106, and the base wall 104) to prevent degradation of the medicament canister 102 over time.

The rim portion 110, the first contour 116, the neck portion 114, the second contour 118, and the side wall 106 may be configured for coupling the medicament canister 102 to an accessory, such as a metering valve and/or an actuator or mouthpiece, for administering the medication. The medicament canister 102 may be formed from any suitable material for packaging and delivery of an aerosolized drug, for example, glass and metals such as steel, aluminum and tin. In an aspect, the medicament canister 102 may be an aluminum canister.

Figure 2:
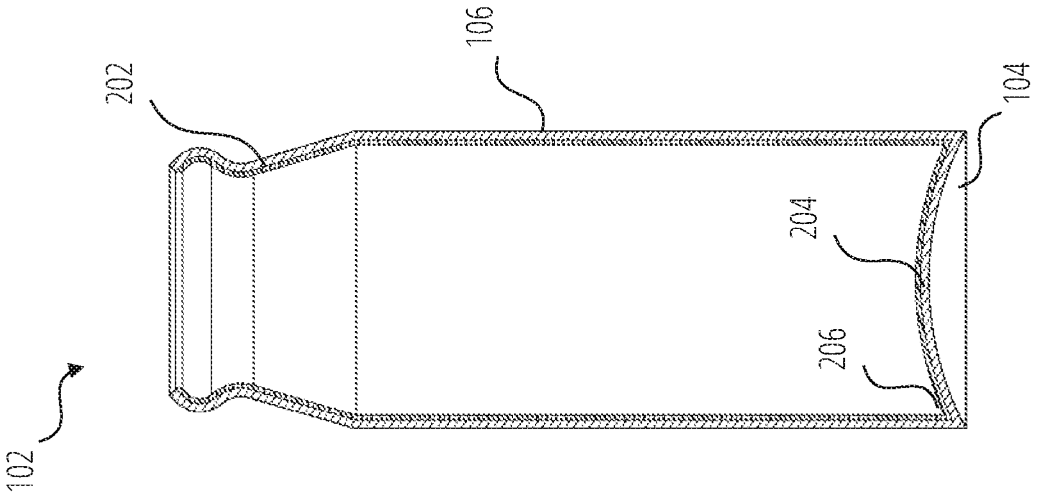
FIG. 2 is a cross-section view of a coated medicament canister prepared with a polyester spray coating, according to an exemplary embodiment.

FIG. 2 shows a cross section view of the medicament canister 102 that has been cut in half. The medicament canister 102 may be coated internally with a polyester coating 202 as described below. As shown in FIG. 2, the base wall 104 of the medicament canister 102 may include a deformation 204 in the form of a concave curved surface that connects to the side wall 106 at an angle forming a crevice 206. The angle may be about 90-degrees. According to an aspect, the angle may be less than 90-degrees (i.e, an acute angle). The deformation 204 is well-known in the context of aerosol containers for providing increased structural strength to the medicament canister 102 compared to a canister having a flat base wall.

Figure 3:
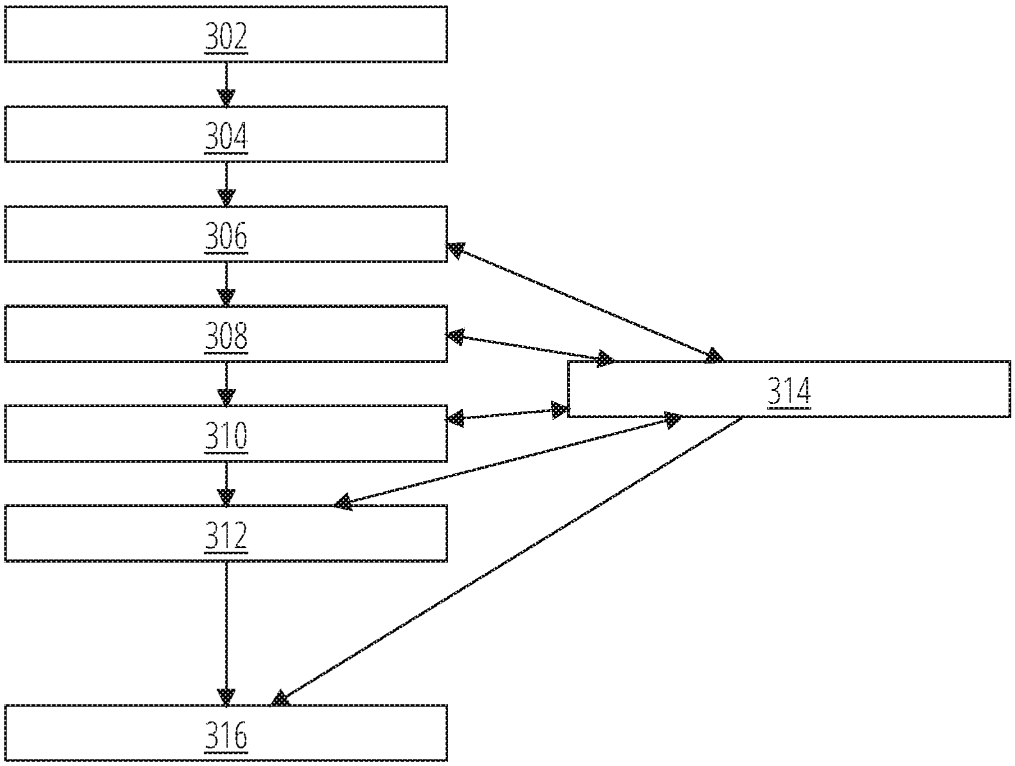
FIG. 3 is a flowchart of a method for preparing a coated medicament canister, according to an exemplary embodiment.

FIG. 3 shows a flowchart for a method of preparing a coated medicament canister. In block 302, a preformed medicament canister (e.g., medicament canister 102) may be provided. In block 304, the medicament canister 102 may be dumped into a container/can descrambler and sorted for placement on a conveyor belt. According to an aspect, the can descrambler is configured to unscramble a plurality of preformed medicament canisters and displace misaligned preformed medicament canisters into an aligned (e.g., upright) position. In an aspect, the present method contemplates providing a medicament canister 102 that is fully formed (i.e., in condition to be cleaned, coated, and filled with medication). In other words, the rim portion 110, first contour 116, neck portion 114, second contour 118, side wall 106, and base wall 104 are formed in the medicament canister 102 prior to treatment and coating. The medicament canister 102 may be formed by known methods, such as extrusion or dye-press. However, it is also contemplated that steps for providing the preformed medicament canister, such as forming the canister by extrusion or dye-press, may be included as preliminary steps in the present method.

When the medicament canister 102 is formed, the surfaces of the medicament canister 102 are coated with residual oils that may prevent proper adhesion of a coating to the medicament canister 102. In block 306, the medicament canister 102 may be cleaned to ensure proper adhesion of the coating to the surface of the medicament canister 102. The medicament canister 102 may be cleaned using any known process, for example, water bath, acid wash, exposure to temperature conditions, pressure conditions, and the like. In an aspect, the medicament canister 102 may be cleaned without the use of a caustic acid bath or water rise. In an exemplary embodiment and as described in with reference to FIG. 4, the medicament canister 102 may pass through an annealing oven (annealing oven 406) for exposure to temperatures high enough to burn off the coating, oil/residue on the surface of the medicament canister 102 resulting from the previous manufacture processing of the medicament canister 102.

In block 308, the inner and/or outer surface of the medicament canister 102 may be coated with a liquid coating, for example, with a polyester coating.

In block 310, the medicament canister 102 may be passed through a drying oven set to a first temperature to dry the coating.

In block 312, the medicament canister 102 may be passed through a curing oven set to a second temperature to cure the coating. In an aspect, the drying oven and the curing oven may be provided as separate apparatuses, or alternatively they may be provided as isolated heated chambers within a unitary oven apparatus.

In block 316, the medicament canister 102 may be packaged for shipment to a subsequent location (e.g., customer facility, testing facility, etc.).

In block 314, the medicament canister 102 may undergo optional testing relating to development, quality control or quality assurance at any point, for example, at a point before coating (block 308) to before packaging (block 316). Testing of the medicament canister 102 may include one or more of, for example, a visual inspection of the interior surface of the medicament canister 102, a surface scratch test, a WACO test, a camera (e.g., infrared camera) imaging test, integrity testing, a grease test, a weight test, and the like. It is also contemplated that testing of the medicament canister 102 and/or polyester coating 202 may occur before coating, after coating, before drying, after drying, before curing, and/or after curing.

In an aspect, a visual inspection of the medicament canister 102 may include inspecting the interior surface of the medicament canister 102 after coating and before drying, to assess the coverage of the coating as applied to the interior surface before drying. For example, a visual inspection may lead to the conclusion that the coating was applied unsuccessfully when, for example, the applied coating may have an uneven application, may be excessive on one side or portion of the medicament canister, may have air bubbles/blisters, may form puddles along the walls/crevice of the medicament canister, may have voids or sparsely coated areas, may include marks or indents from contact with line equipment, may include contaminants, etc. A visual inspection may lead to the conclusion that the coating was applied successfully when, for example, the coating is absent of blisters, marks, contaminants, inconsistencies in application, etc. The visual inspection may be performed as a manual visual inspection by a line operator or inspection personnel, or by a device such as a lumen meter, an imaging camera, or any known visual inspection or measurement devices.

In an aspect, a scratch test may be conducted after the coating is dried and cured (i.e., after block 310, block 312). In a scratch test, a medicament canister 102 may be cut in half and the interior surface may be scratched. Then, a piece of tape may be applied to the scratched interior surface and subsequently removed. If the coating on the scratched surface flakes off from the surface, it may be an indication that coating is burnt, and the temperature and/or duration of exposure to the drying oven and/or curing oven may require adjustment.

A grease test may be conducted after drying and curing of the coating (i.e., after block 312). In a grease test, the coated medicament canister 102 may be placed in a water bath for a duration of time, for example about 25 minutes. After the water bath, the coated surface may be scratched. If the coating flakes or peels off as a result of the water bath/scratch test, this may indicate that the surface of the medicament canister 102 was not cleaned (i.e., free of residue) sufficiently, for example, by annealing, prior to application of the coating.

Conductivity tests (e.g., using a WACO conductivity meter, also known as enamel rating, metal exposure tests, mA tests, or porosity tests) may be performed for comparison of conductivity levels before coating (i.e., before block 308) and after drying and curing (i.e., after block 312) to locate faults in the cured coating. In a first test before coating, a medicament canister 102 may be filled with a conductive electrolyte (e.g., salt water) and a test probe may be inserted in the electrolyte to contact the uncoated interior surface of the medicament canister 102. When a voltage is applied to the test probe, an electrical circuit is completed. As a result, the first test before coating may have a high reading, for example, 27.3 milliamperes. The test may be repeated a second time after coating, drying, and curing the polyester coating to the interior surface. When the coating is successfully cured to the interior surface, without void or damage to the coating, the coating will provide a nonconductive insulation layer that will impede the electrical circuit. Accordingly, the second test reading of a successfully applied coating will be much lower, for example, 0.33 milliamperes. If the second test result is similar to or within a range of proximity to the first test result, it may indicate faults in the coating as applied to the medicament canister 102.

Camera or imaging tests may be conducted after drying and curing (i.e., after block 312) to detect visual impairments in the cured coating that are not detectable to the human eye. In an aspect, a camera may be configured to inspect the open interior 120 of each medicament canister 102 after curing. The camera may detect a lumen level of the interior surface of the medicament canister 102. Detection of a lumen level that is too low (i.e., coloration of the coating is too light) may indicate that the layer of coating is too thin. Detection of a lumen level that is too high (i.e., coloration is too dark) may indicate that the coating is burnt. Camera imaging may also be used to inspect the interior surfaces of the base wall 104 and side wall 106 to detect imperfections (e.g., blisters, puddling, etc.) in the coating as applied.

Weight testing may be conducted before coating (i.e., before block 308) and/or after drying and curing (i.e., after block 312) to compare the starting weight of an uncoated medicament canister 102 to the end weight of a coated medicament canister 102. In an aspect, a control weight can may be used for a starting weight in lieu of weighing the uncoated medicament canister 102. Comparing the starting weight to the end weight of the medicament canister 102 may provide data regarding coating material use rate, ideal coating volume ranges, etc.

Figure 4:
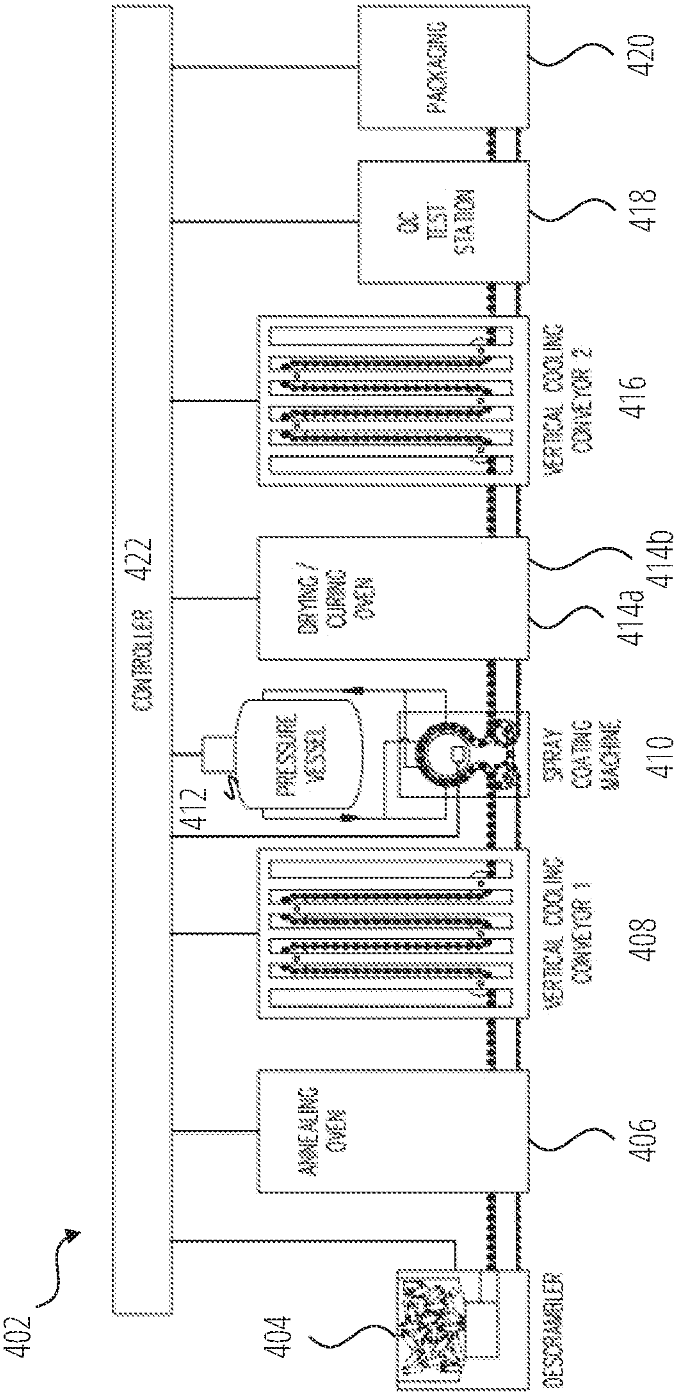
FIG. 4 is a schematic view of a medicament canister spray coating line, according to an exemplary embodiment.

FIG. 4 shows a schematic view of a medicament canister processing line 402, according to an exemplary embodiment. The processing line 402 may include a descrambler 404, an annealing oven 406, a first cooling conveyor 408, a spray gun assembly 410 including a pressure pot 412, a drying oven 414*a*, a curing oven 414*b*, a second cooling conveyor 416, a testing station 418, and a packaging station 420. The processing line 402 may be controlled by a controller 422 that is connected to each of the line components. Alternatively or additionally, each line component may be independently controlled by a designated controller.

In an aspect, the steps of a method of preparing a medicament canister (e.g., as detailed in FIG. 3) may be carried out utilizing the processing line 402 of FIG. 4. A preformed canister (such as, for example, medicament canister 102) may be provided. While the exemplary embodiment contemplates use of the processing line 402 with a preformed canister, the processing line 402 may be combined in whole or in part with a manufacture line to process material in sheet form into canisters for passing through the processing line 402.

With reference again to FIG. 4, a plurality of preformed medicament canisters may be dumped into the descrambler 404. The descrambler 404 is configured to sorts, align, and position the medicament canisters onto a conveyor belt. The medicament canister may then pass from the conveyor belt to the annealing oven 406, where the canister surfaces are exposed to a designated temperature for a designated duration of time sufficient to anneal, or burn off, the surface residue left on the canister from the manufacture process. The temperature and duration of time that the canister is exposed to the annealing oven may depend on a number of factors, including, for example, material composition of the canister, wall thickness, composition of the surface residue, surface area of the canister, mass of the canister, and the like. In an aspect, the medicament canister 102 may be placed in a cradle basket that is attached to a chain which travels on a path through the annealing oven 406.

In an exemplary embodiment, the medicament canister 102 may be exposed to a temperature of between about 290° C. and about 300° C. for between about 4 minutes to about 4 minutes and 30 seconds to burn off residue from the interior and/or exterior surfaces of the medicament canister 102. In another exemplary embodiment, the medicament canister 102 may be heated to a temperature of between about 280° C. and about 290° C. for between about 5 minutes and 5 seconds to about 5 minutes and 10 seconds.

Once cleaned, the medicament canister 102 may be passed through a spray gun assembly 410 equipped with one or more spray guns configured to coat the internal surface of the medicament canister 102. In an aspect, the coating may be a polyester coating. In an aspect, the coating may be a solvent-based polyester coating. The coating machine, spray guns, and detailed application of the coating to the medicament canister 102 are described in further detail with respect to FIG. 5 to FIG. 10C.

After coating, the medicament canister 102 is passed through a drying oven 414*a* and a curing oven 414*b*. The medicament canister 102 may be exposed to a first temperature in a drying oven to dry the coating. The drying oven may be set to a temperature of about 205° C. to about 215° C. The medicament canister 102 may be exposed to the conditions of the drying oven for between about 3 minutes and 20 seconds to about 3 minutes and 50 seconds to dry the coating.

The medicament canister 102 may then be exposed to a second temperature in a curing oven to cure the coating. The curing oven may be set to a temperature of about 245° C. to about 255° C. The medicament canister 102 may be exposed to the conditions of the curing oven for between about 7 minutes and 20 seconds to about 7 minutes and 50 seconds to cure the coating. The drying and curing temperatures for the method detailed herein are believed to be lower than those in known methods of coating an interior surface of a canister with a curable aerosolized coating. The parameters detailed herein are exemplary and not intended to limit this disclosure. In an aspect, the temperature required to dry and cure a coating as described above may be relatively low compared to known coating compositions. Accordingly, the wall thickness of the medicament canister 102 may be reduced without overexposure of the medicament canister 102 that may result in the coating being burned, or weakening of the canister or material forming the canister due to heat exposure. For example, a canister coated with Teflon coating may have a target wall thickness of between about 0.60 mm to about 0.70 mm, or about 0.65 mm, to reduce the risk of deformation or denting after coating and curing. A canister with a polyester coating according to an embodiment herein may be cured with exposure to lower temperatures relative to a Teflon-coated canister, and as such there is less risk of deformation or denting after curing. In an aspect, the canister in an embodiment may have a target wall thickness of about 0.41 mm, resulting in reduced costs and materials needed for production of the polyester-coated canister.

It is contemplated that the drying oven and the curing oven may be provided as a single oven facility including a drying chamber and a curing chamber heated to the first temperature and the second temperature as detailed above. The medicament canister 102 may pass through each chamber for the times detailed above, for a total time in the oven facility of between about 11 minutes to about 11 minutes and 30 seconds. Parameters of time and temperature may vary depending on factors, e.g., the size of the annealing oven, the composition of the medicament canister 102, the composition of the coating, the wall thickness of the medicament canister 102, etc.

Following the drying oven 414*a* and curing oven 414*b*, the medicament canister 102 may be passed to the second cooling conveyor 416. In an aspect, the first cooling conveyor 408 and the second cooling conveyor 416 may be provided as vertical conveyor systems that contain a significant length of conveyor track in a relatively compact surface area. This may enable certain components of the line to continue processing at a designated speed without backing up or inundating the line if neighboring components are forced to stop or operate at a different speed.

Following the second cooling conveyor 416, the medicament canister 102 enters the testing station 418 for optional testing as detailed above with reference to FIG. 3. In an aspect, if an unsatisfactory test result is detected, the faulty medicament canister 102 may be automatically removed from the conveyor line. For example, the testing station 418 may include an imaging camera configured for lumen testing as described above, and an air gun positioned next to the imaging camera alongside the conveyor. If a medicament canister 102 is tested and the lumen levels are detected to be outside of an acceptable range, the air gun may be actuated to release an airstream directed into the open end 108 of the medicament canister 102 that is strong enough to blow the medicament canister 102 off of the conveyor line. As a result, the faulty medicament canister 102 does not reach the packaging station 420. In a further aspect, when an unsatisfactory test result is detected, a controller 422 may be configured to pause the processing line 402 for further inspection of the line components and/or medicament canisters that are contemporaneously being processed.

Confirmatory testing may be conducted to determine the weight of coating applied to the medicament canister. In an aspect, weight testing of the medicament canister before coating and after coating may be used to determine if an adequate amount of coating solids have been applied to the medicament canister. In an aspect, a weight of between about 0.021 milligrams and about 0.035 milligrams of coating, or 0.028 milligrams of coating, may be applied to a 14 mL canister. A weight of between about 0.033 milligrams and about 0.047 milligrams of coating, or 0.040 milligrams, of coating may be applied to a 19 mL canister. When the 14 mL and the 19 ML canisters are dried and cured, the weight of the dried and cured coating will be less than the wet applied coating.

When the medicament canister 102 is successfully tested and no faults are found, it may be passed to the packaging station 420 for final processing, including, for example, packaging for shipment to a customer location or to an external testing location.

Figure 5:
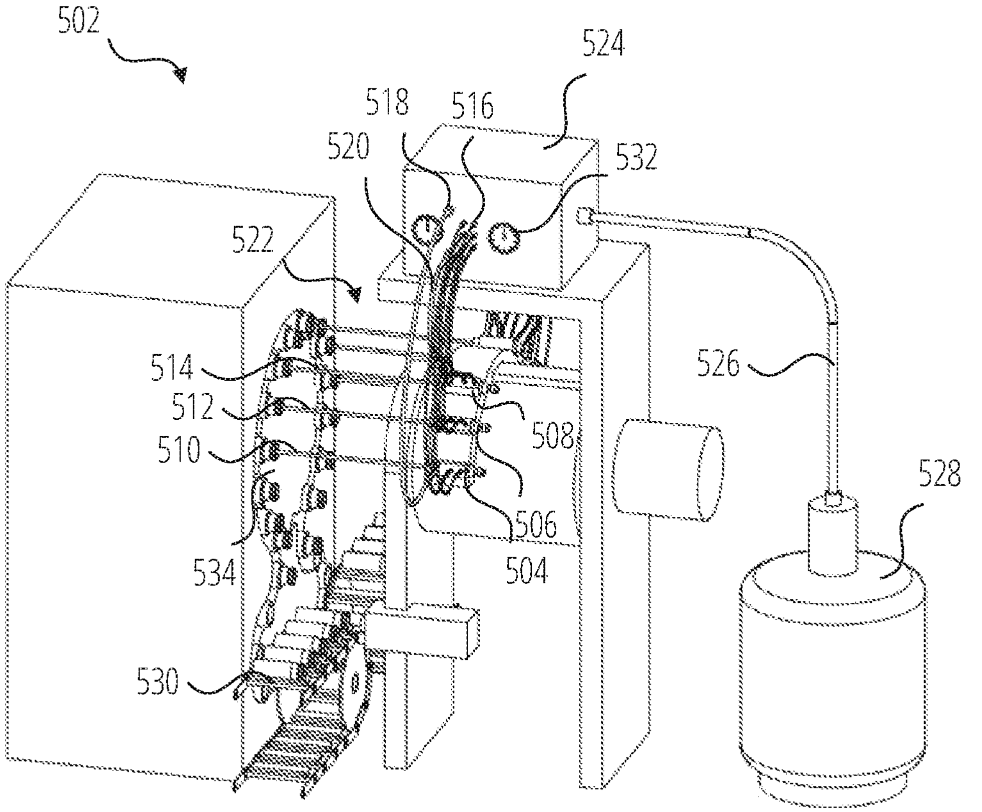
FIG. 5 is a perspective view of the coater and pressure pot of FIG. 4 in position in a medicament canister spray coating line, according to an exemplary embodiment.

FIG. 5 is an exemplary embodiment of a coater 502 configured to apply one or more internal layers of a coating (e.g., a polyester coating) to the internal surface of the medicament canister 102. The coater 502 may include a drum 534 connected to a conveyor 530, and a spray gun assembly 522 including one or more spray guns 504, 506, 508. Each spray gun may have a respective nozzle, 510, 512, 514 that is configured to be inserted into an open interior of a medicament canister 102 to spray the coating onto the interior surface of the medicament canister 102.

The coating supply unit 524 may house components for circulating the coating through the coater 502 and monitoring and/or adjusting conditions of the coating after it enters the coater 502 from a pressure pot 528. For example, the coating supply unit 524 may include pressure pumps, regulators, sensors, controls, and the like (shown, e.g., in FIG. 5 as gauge 532 and FIG. 7 as gauge 706), to connect the pressure pot 528 to the spray guns and to monitor and control coating temperature, pressure, flow rate, volume, and the like.

A coating line input 518 may connect from the coating supply unit 524 to a first spray gun 504 to provide a flow path of coating from a coating reservoir (e.g., pressure pot 528) through the coating supply unit 524 to the first spray gun 504. The one or more spray guns may be connected in series, in other words, the unused coating may flow from the first spray gun 504 to the second spray gun 506, and from the second spray gun 506 to the third spray gun 508. Any coating that is not used during the coating process by the spray gun assembly 522 may exit the coater 502 through the coating line output 520 and coating supply unit 524. The coating may exit from and be returned to the coating reservoir or pressure pot 528 through one or more pressure pot lines 526, for further treatment to maintain parameters/conditions consistent for application.

Air lines 516 with input and output hoses connected to each spray gun 504, 506, 508 and to the coating supply unit 524 are provided on the coater 502 and may provide pressurized air to each nozzle 510, 512, 514. In an aspect, the spray guns may be independently configured to release air through an air tube associated with the respective nozzle when the coating is sprayed. For example, the first spray gun 504 may include a first nozzle 510 configured to spray at a first spray angle, the second spray gun 506 may include a second nozzle 512 configured to spray at a second spray angle, and the third spray gun 508 may include a third nozzle 514 configured to spray at a third spray angle. In an embodiment, each of the first spray angle, the second spray angle, and the third spray angle may be a different spray angle. In an embodiment, two or more of the spray angles of the three nozzles 510, 512, 514 may be the same. In an aspect, the release of the air may influence the spray angle of the coating when sprayed from the nozzle.

The coating may be applied by aerosolizing and spraying the coating with the spray gun onto the interior surface of the medicament canister 102. For application, a spray gun air nozzle may be inserted through the open end 108 and rim portion 110 of the canister and into the open interior of the canister, and the layer of coating applied to the interior surface of the medicament canister 102. The medicament canister 102 may be rotated during the application of the coating to provide even application of the coating on the inner/interior surface of the medicament canister 102.

While the exemplary embodiments show the coater 502 with three spray guns, it is contemplated that one or more embodiments may provide one, two, three, or more than three spray guns. Each of the spray guns may be configured to spray at a similar or the same spray angle, or alternatively, each of the spray guns may be configured to spray at a different spray angle to ensure adequate coverage of the inner surfaces of the medicament canisters.

Figure 6:
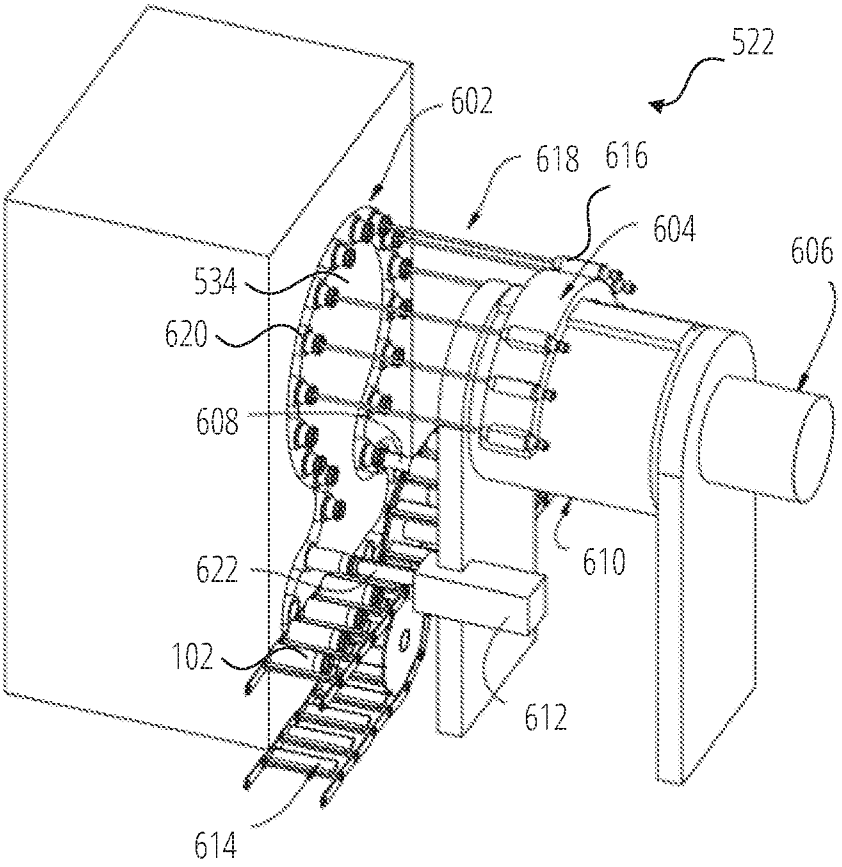
FIG. 6 is a top front left perspective view of the coater and spray gun assembly of FIG. 5.

FIG. 6 is a schematic illustration of the spray gun assembly 522 of FIG. 5. The spray gun assembly 522 may include a carriage 604 that retains and positions a spray gun 616 and associated nozzle 618 for inserting the nozzle 618 into a medicament canister and applying a layer of coating to the interior surface of the medicament canister. The carriage 604 may be a linear carriage that is powered by a motor 606.

In use, a medicament canister may travel along the conveyor from the annealing oven (not shown) in a conveyor cradle 614 and be placed into a cone 620 provided on the drum 534, for example, by a pushrod 622. The pushrod 622 may be powered by a pushrod actuator 612 to extend and retract the pushrod 622 for positioning of the canister in the cone 620. The cone 620 may secure the medicament canister 102 by a bottom portion of the medicament canister 102 in the drum 534. The cone 620 may be directed along a track or circuit 602, powered by motor 606 and rotating body 610, and may travel in alignment with the movement path of the carriage 604, the spray guns, and their associated nozzles. In an aspect, the cone 620 and drum 534 may be configured to spin in complement with the spraying application of the spray gun assembly 522. After the spray coating is applied to the medicament canister, a second pushrod 608 may be actuated to remove the medicament canister from the cone.

Additional layers of coating may be applied to the interior surface of the medicament canister 102 while the medicament canister 102 is positioned in the cone 620. In an embodiment, each layer of coating may be directed to a particular portion of the interior surface. In an aspect, a first layer of coating may be applied by spraying the coating onto an interior surface of the base wall 104 of the canister. A second layer of coating may be applied by spraying the coating onto an interior surface of the neck portion, rim, and at least a portion of an interior surface of the side wall of the canister. A third layer of coating may be applied by spraying the coating onto an entire interior surface of the canister. It is contemplated that the specific areas to be coated by each layer, the order of the layers of coating, and the total number of layers of coating is not limited by the embodiment described above. The areas to be coated, the order of the layers, and the total number of layers may be dependent on intrinsic qualities of the medicament canister 102 to be coated. For example, additional layers of coating may be needed in an application in which the medicament canister 102 includes additional contours or segmented sections along the medicament canister 102.

Application of the coating layer or layers may include use of a single spray gun/air nozzle for spraying each layer of coating. In an embodiment, each layer of coating may be sprayed by a designated spray gun/air nozzle that is configured to spray the interior surface based on predetermined parameters. In an aspect, a reverse spray air nozzle may be inserted through the open end 108 and rim portion 110 of the medicament canister 102 and into the interior of the canister. The reverse spray air nozzle may be configured to spray a layer of coating onto at least a portion of the interior surface of the medicament canister 102 at a reverse angle away from the base wall 104 and towards the rim portion 110.

Figure 7:
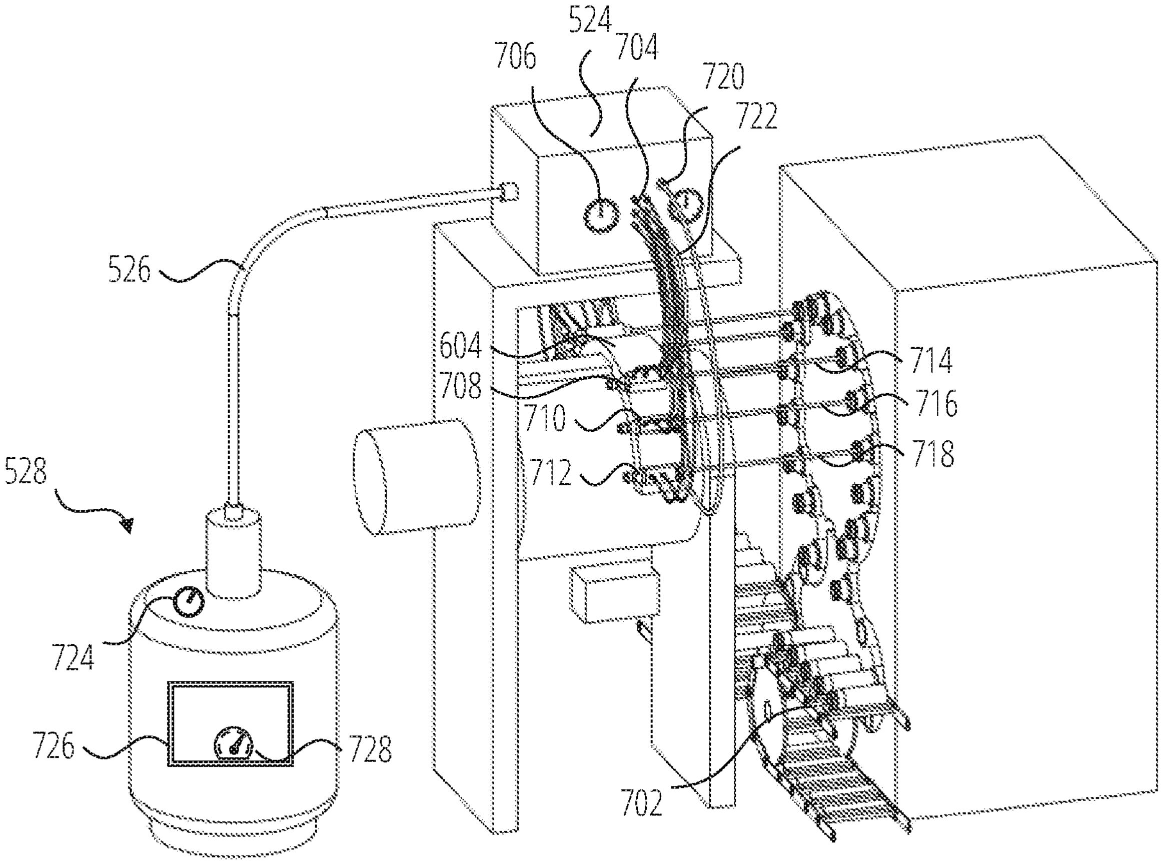
FIG. 7 is a top front right perspective view of the coater and pressure pot of FIG. 5.

FIG. 7 is a perspective view of the spray gun assembly 522 shown in FIG. 6. As shown in FIG. 7, after coating the medicament canister 102 may be returned to the processing line by a second conveyor 702. In an aspect, a pushrod may be actuated to remove the medicament canister 102 from the cone to continue down the line towards the drying oven, curing oven, and testing station (not shown).

In an embodiment, the spray gun assembly 522 may include a second set of spray guns and nozzles, for example, first spray gun 708 and first nozzle 714, second spray gun 710 and second nozzle 716, and third spray gun 712 and third nozzle 718. The second set of spray guns are similarly connected to the carriage 604, and may include the same functions and features as described above with reference to the spray guns 504, 506, 508 shown in FIG. 5 (including, e.g., air line 704, coating line input 720, and coating line output 722). The spray gun 708, 710, 712 may be connected to the coating supply unit 524, the pressure pot line 526, and the pressure pot 528 as described with reference to FIG. 5.

The pressure pot 528 may include sensors and controllers to monitor and control one or more characteristics of the coating contained in the pressure pot 528. While in the pressure pot 528, the coating may be treated to meet established parameters for application. For example, a solvent may be added to the coating before application to reduce the viscosity of the coating. The solvent added to the coating (e.g., polyester coating) may be a composition including dimethyl glutarate and dimethyl succinate. In an embodiment, any component (e.g., solvent, coating, carrier, etc.) added to the pressure pot 528 may be heated to a similar temperature as the temperature of the coating inside the pressure pot 528, to avoid unintentional changes to viscosity from the addition of a component at a different (e.g., lower or higher) temperature.

Before application of the coating, further aspects of the coating may be adjusted. For example, the coating may be treated (e.g., with heat treatment) so that it attains a viscosity of between about 1 minute and 6 seconds and about 1 minute and 16 seconds at about 27° C. using a #4 Ford dip cup. While addition of the solvent may impact (i.e., reduce) viscosity of the coating composition, heat and/or pressure treatment may also be applied to adjust the viscosity in order to avoid issues with curing that may result from over-thinning the coating compound through the addition of solvent. It is believed that overuse of solvent can cause coating to migrate or sag along the walls of the canister, resulting in uneven curing that can cause blisters or burning on the coated surface. The pressure pot 528 may include a heating element 726 connected to the pressure pot 528, which may include sensors and/or controls to monitor and regulate the internal temperature of the pressure pot 528. In the exemplary embodiment, a heating element 726 may be configured to heat the coating inside the pressure pot 528. In an aspect, the heating element 726 may be a heating pad positioned in contact with an outer surface of the pressure pot 528 and may include a temperature controller 728 to monitor and control the heating pad temperature.

Further to treatment with solvent and heat, the coating may be pressurized in the pressure pot 528 and/or in the spray gun assembly 522. In an aspect, the pressure pot 528 may be configured to maintain an internal pot pressure of between about 28 psi and about 32 psi. In an aspect, the spray gun assembly 522 may be configured to maintain an atomizing air pressure of between about 68 psi and about 72 psi. Each of the pressure pot 528 and the spray gun assembly 522 may include one or more compressors and sensors and/or controls to monitor and regulate the internal pressure in the pressure pot 528 and/or the system or specific spray gun pressure in the spray gun assembly 522. In the exemplary embodiment, a pressure gauge 724 may display the internal pressure of the pressure pot 528.

The pressure pot 528 and/or the spray gun assembly 522 may further include connections (not shown) to external monitoring and testing apparatus to collect data related to the parameters of the coating before and during the coating process.

FIG. 8A shows a spray gun 802 configured for use in a spray gun assembly (e.g., spray gun assembly 522). The spray gun 802 may include a spray gun body 804 having one or more ports 806 for connection to air lines and/or coating lines as discussed above. The spray gun body 804 may include an adjustment knob 808 (as discussed in detail below) that is configured to control one or more characteristics of the spray coating output from the spray gun 802. In an embodiment, the spray gun 802 may include a nozzle 810 that is sized and shaped to be inserted into the open interior of the medicament canister. An air cap 812 may be configured to adjust a spray angle of the coating as it exits the nozzle 810.

FIG. 8B shows a detailed view of an end of the nozzle 810 of FIG. 8A. An air cap tip 814 may extend from the air cap 812 in a direction away from the spray gun body 804. One or more air holes 818 may be formed in the air cap tip 814 to provide an exit for pressurized air provided from the coating supply unit and air lines to the spray gun 802. A coating nozzle and/or a coating nozzle tip 820 of the coating nozzle may be provided at least partially inside of the air cap 812 and may extend through an air cap opening 816 formed on an end of the air cap 812.

The coating nozzle tip 820 may be positioned relative to the air cap tip 814 and the air hole 818. In an aspect, the spray angle of coating that is sprayed out of the coating nozzle opening may be influenced by the pressurized air exiting from the air hole 818. In an aspect, the volume of air exiting the air hole 818 may be adjusted according to the particular needs of the application, as may be the number, size, position and/or orientation of the air hole 818 on the air cap tip 814 and/or relative to the coating nozzle tip 820.

FIG. 9 shows an exploded view of the spray gun 802, including the air cap 812, a coating nozzle 908, and a needle 904. The air cap 812 may connect to a nozzle connector 902 provided on the spray gun body 804. In an aspect, the relative diameters of each of the air cap 812, the coating nozzle 908, and the needle 904 are such that the coating nozzle 908 may be positioned inside of the air cap 812, and the needle 904 may be positioned inside of the coating nozzle 908. The needle 904 may include a needle tip 906 that is dimensioned with a profile corresponding in size and shape to the profile of the coating nozzle tip 820. For example, the coating nozzle tip 820 may be provided as a hollow cone-shaped tip and the needle tip 906 may be provided as a pointed tip configured to fit within the hollow cone of the coating nozzle tip 820.

Figure 10A:
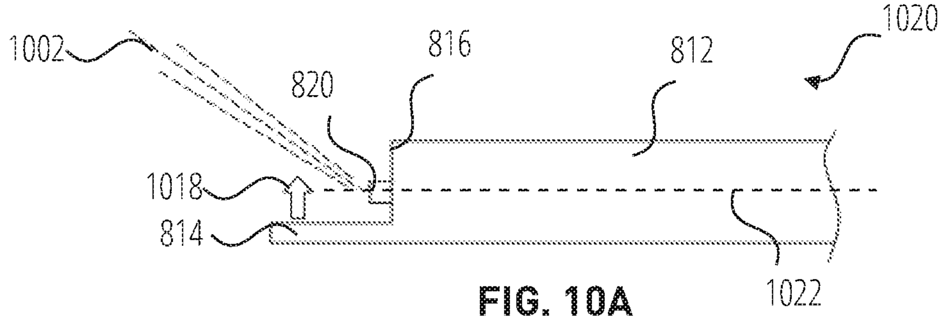
FIG. 10A is a cross section view of the spray gun nozzle of FIG. 8A in a first configuration, according to an exemplary embodiment.

FIG. 10A shows a spray gun nozzle assembly 1020 in a first configuration to provide an angled spray output 1002. An angle of the spray output 1002 may be defined as an angle formed by the direction of the spray path and an axis 1022 extending along a length the air cap 812. In the first configuration, the coating nozzle tip 820 may be positioned relative to the air cap 812 so that it extends beyond the air cap opening 816. In an aspect, the coating nozzle tip 820 may be positioned adjacent to the air holes provided in the air cap tip 814 so that pressurized air passing through the air holes in a direction 1018 (i.e., in a direction perpendicular to or transverse to the axis 1022) influences the angle of the spray output 1002. In an aspect, the angle of the spray output 1002 may be adjusted by moving the coating nozzle tip 820 closer to or farther away from the air holes. For example, the output angle of the spray output 1002 may decrease (i.e., the spray output 1002 may approach a straight line, as in FIG. 11A) as the coating nozzle tip 820 is positioned farther from the air holes.

The spray angle of the spray output may be adjusted by adjusting a position of the nozzle 810 relative to the air cap 812. With reference to FIG. 8A and FIG. 9, a method of adjusting the spray angle of the spray output may include inserting the needle 904 through the spray gun body 804 and through the coating nozzle 908, and coupling the coating nozzle 908 to the spray gun body 804, for example with a threaded coupling. The air cap 812 may include an air cap base 910 that may be coupled to the spray gun body 804, for example with a threaded coupling. The position of the air cap tip 814 relative to the coating nozzle tip 820 may then be adjusted by rotating the air cap 812 to increase or decrease the distance. Once a desired distance between the air cap tip 814 and the coating nozzle tip 820 is achieved, the spray assembly positioning may be secured with a locknut (not shown).

In an embodiment, the spray angle of the spray output may be between about 40° and about 55°. According to an aspect, the appropriate spray angle for a particular application (i.e., based on the profile of the canister or substrate) may be smaller or larger and may be determined through testing.

Figure 10B:
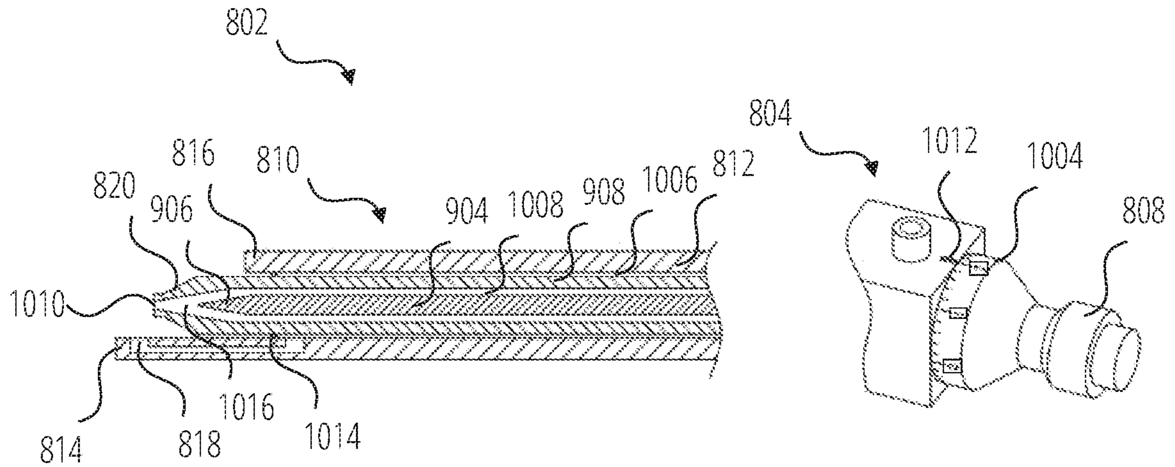
FIG. 10B is a cross section view of the spray gun nozzle of FIG. 10A, showing the nozzle needle in a first position, according to an exemplary embodiment.
Figure 10C:
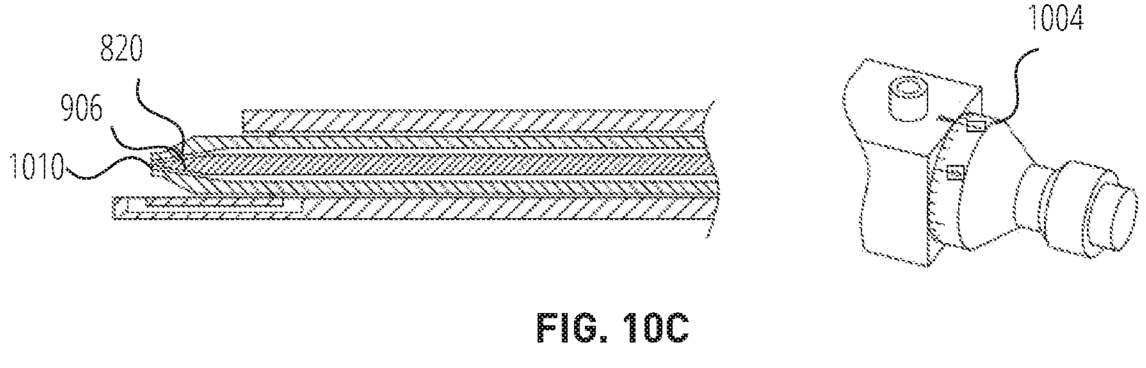
FIG. 10C is a cross section view of the spray gun nozzle of FIG. 10A, showing the nozzle needle in a second position, according to an exemplary embodiment.

FIG. 10B and FIG. 10C show a cross section view from line 10-10 of FIG. 8B of the spray gun 802 in the first configuration of FIG. 10A. The adjustment knob 808 associated with the spray gun body 804 may include a dial 1004 marked with measurement indicators. A marker 1012 may be provided on the spray gun body 804 to provide a reading based on alignment of the marker 1012 with a measurement indicator on the dial 1004. Turning to the nozzle 810, shown in an assembled view according to an exemplary embodiment, an air cap bore 1006 may be formed through the air cap 812. The coating nozzle 908 may be positioned in the air cap bore 1006 and a seal 1014 may be provided between the coating nozzle 908 and an inner wall of the air cap 812 to form a pressure seal between the air cap 812 and the coating nozzle 908.

A coating nozzle bore 1008 may be formed through the coating nozzle 908 and the needle 904 may be provided in the coating nozzle bore 1008. As seen in FIG. 10B, a space 1016 may be provided in the coating nozzle bore 1008 between the coating nozzle tip 820 and the needle tip 906. In this position (i.e., first position), the needle tip 906 is spaced apart from a coating nozzle opening 1010 provided on the coating nozzle tip 820. In the first position, coating may flow relatively unrestricted through the coating nozzle bore 1008 and exit through the relatively unobstructed coating nozzle opening 1010.

FIG. 10C shows the needle tip 906 in a second position. To adjust the position of the needle tip 906 (e.g., from the first position to the second position), the adjustment knob 808 and dial 1004 may be rotated. As seen in FIG. 10B, the marker 1012 is aligned with measurement indicator 2, while in FIG. 10C, the marker 1012 is aligned with measurement indicator 1. In the second position, the needle tip 906 is advanced towards the coating nozzle opening 1010 so that there is relatively less space in the coating nozzle bore 1008 between the coating nozzle tip 820 and the needle tip 906. As the needle tip 906 approaches the coating nozzle tip 820, the volume of coating permitted to flow through the coating nozzle bore 1008 and exit through the coating nozzle opening 1010 decreases. Adjustments of the position of the needle 904 within the coating nozzle bore 1008 may be made according to the specific needs of the application for each coating layer.

Figure 11A:
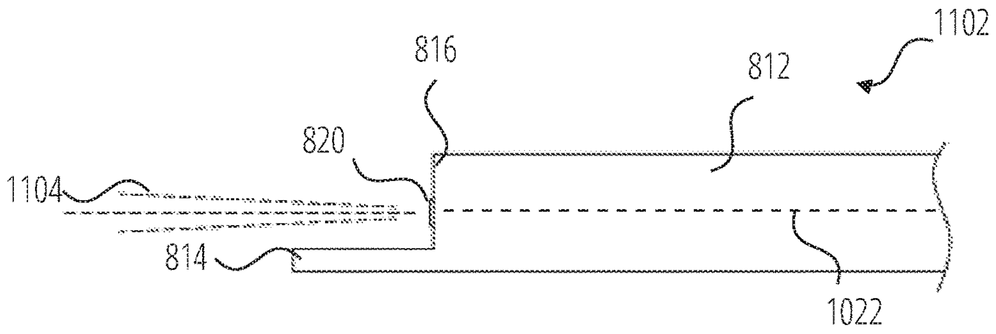
FIG. 11A is a cross section view of the spray gun nozzle of FIG. 8A in a second configuration, according to an exemplary embodiment.

As shown in FIG. 11A, a spray gun nozzle assembly 1102 may be in a second configuration to provide a non-angled, straight spray output 1002. In the exemplary embodiment, the direction of the spray path and the axis 1022 may be co-linear, i.e., forming a 180° angle. In the second configuration, the coating nozzle tip 820 may be positioned relative to the air cap 812 so that it is directly aligned with or barely extends beyond the end of the air cap 812 through the air cap opening 816. In an aspect, the spray gun nozzle assembly 1102 may not include air holes, or alternatively, the spray gun nozzle assembly 1102 may be configured so that pressurized air does not pass through air holes formed in the air cap tip 814, so that the spray output 1104 is not influenced by pressurized air traveling in a particular direction.

Figure 11B:
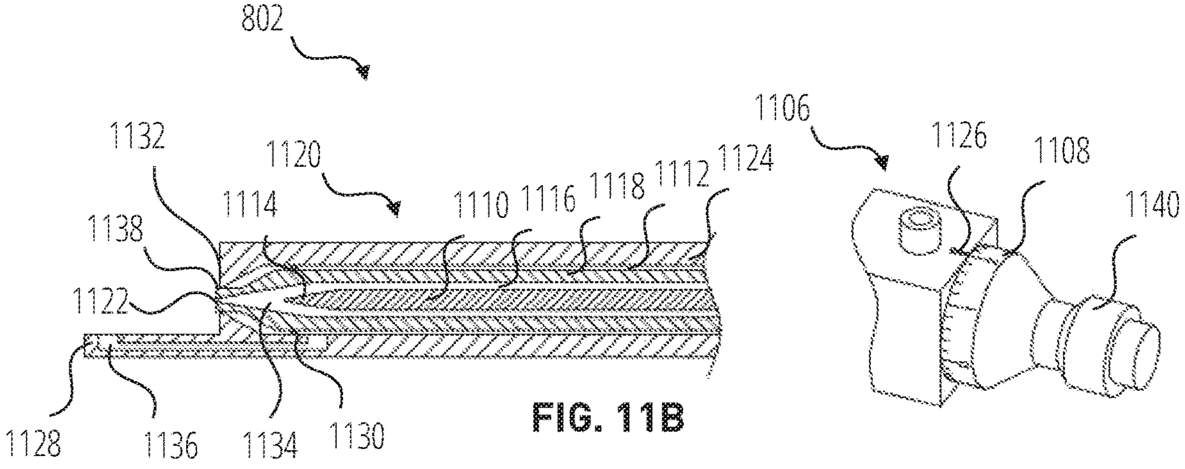
FIG. 11B is a cross section view of the spray gun nozzle of FIG. 11A, showing the nozzle needle in a first position, according to an exemplary embodiment.
Figure 11C:
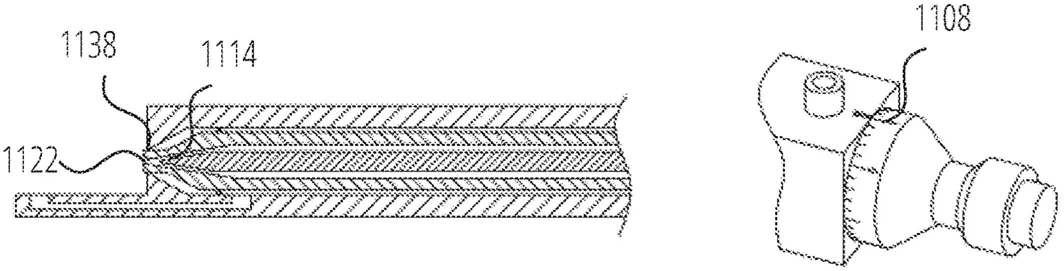
FIG. 11C is a cross section view of the spray gun nozzle of FIG. 11A, showing the nozzle needle in a second position, according to an exemplary embodiment.

FIG. 11B and FIG. 11C show a cross section view of the spray gun 802 in the second configuration of FIG. 11A. The adjustment knob 1140 associated with the spray gun body 1106 may include a dial 1108 marked with measurement indicators. A marker 1126 may be provided on the spray gun body 1106 to provide a reading based on alignment of the marker 1126 with a measurement indicator on the dial 1108.

Turning to the nozzle 1120, shown in an assembled view according to an exemplary embodiment, an air cap bore 1112 may be formed through the air cap 1124. The coating nozzle 1118 may be positioned in the air cap bore 1112 and a seal 1130 may be provided between the coating nozzle 1118 and an inner wall of the air cap 1124 to form a pressure seal between the air cap 1124 and the coating nozzle 1118.

A coating nozzle bore 1116 may be formed through the coating nozzle 1118 and the needle 1110 may be provided in the coating nozzle bore 1116. As seen in FIG. 11B, a space 1134 may be provided in the coating nozzle bore 1116 between the coating nozzle tip 1138 and the needle tip 1114. In this position (i.e., first position), the needle tip 1114 is spaced apart from a coating nozzle opening 1122 provided on the coating nozzle tip 1138. In the first position, coating may flow relatively unrestricted through the coating nozzle bore 1116 and exit through the relatively unobstructed coating nozzle opening 1122.

FIG. 11C shows the needle tip 1114 in a second position. To adjust the position of the needle tip 1114 (e.g., from the first position to the second position), the adjustment knob 1140 and dial 1108 may be rotated. As seen in FIG. 11B, the marker 1126 is aligned with measurement indicator 2, while in FIG. 11C, the marker 1126 is aligned with measurement indicator 1. In the second position, the needle tip 1114 is advanced towards the coating nozzle opening 1122 so that there is relatively less space in the coating nozzle bore 1116 between the coating nozzle tip 1138 and the needle tip 1114. As the needle tip 1114 approaches the coating nozzle tip 1138, the volume of coating permitted to flow through the coating nozzle bore 1116 and exit through the coating nozzle opening 1122 decreases. Adjustments of the position of the needle 1110 within the coating nozzle bore 1116 may be made according to the specific needs of the application for each coating layer.

This disclosure, in various embodiments, configurations and aspects, includes components, methods, processes, systems, and/or apparatuses as depicted and described herein, including various embodiments, sub-combinations, and subsets thereof. This disclosure contemplates, in various embodiments, configurations and aspects, the actual or optional use or inclusion of, e.g., components or processes as may be well-known or understood in the art and consistent with this disclosure though not depicted and/or described herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while considering that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that the appended claims should cover variations in the ranges except where this disclosure makes clear the use of a particular range in certain embodiments.

The terms "determine", "calculate" and "compute," and variations thereof, as used herein, are used interchangeably, and include any type of methodology, process, mathematical operation or technique. The terms "charge tube," "charge holder," "charge strip," and variations thereof, as used herein, are used interchangeably and include any type of charge holding, retaining, or positioning structure.

This disclosure is presented for purposes of illustration and description. This disclosure is not limited to the form or forms disclosed herein. In the Detailed Description of this disclosure, for example, various features of some exemplary embodiments are grouped together to representatively describe those and other contemplated embodiments, configurations, and aspects, to the extent that including in this disclosure a description of every potential embodiment, variant, and combination of features is not feasible. Thus, the features of the disclosed embodiments, configurations, and aspects may be combined in alternate embodiments, configurations, and aspects not expressly discussed above. For example, the features recited in the following claims lie in less than all features of a single disclosed embodiment, configuration, or aspect. Thus, the following claims are hereby incorporated into this Detailed Description, with each claim standing on its own as a separate embodiment of this disclosure.

Advances in science and technology may provide variations that are not necessarily express in the terminology of this disclosure although the claims would not necessarily exclude these variations.

What is claimed is:

1. A method of preparing a medicament canister, comprising:

providing a canister having a base wall, an open end opposite the base wall, and a side wall extending between the base wall and the open end, and an interior surface defined by the base wall and the side wall, wherein the side wall comprises a neck portion extending around the open end, and the canister is composed of aluminum;

heating an oven to a temperature between about 290° C. and about 300° C.;

annealing the canister in the heated oven for between about 4 minutes to about 4 minutes and 30 seconds to burn off residue from the interior surface of the canister;

spraying a layer of a solvent-based polyester coating to the interior surface of the canister;

passing the canister through a drying chamber set to a first temperature of about 205° C. to about 215° C. for between about 3 minutes and 20 seconds to about 3 minutes and 50 seconds to dry the layer of coating; and then passing the canister through a curing chamber set to a second temperature of about 245° C. to about 255° C. for about 7 minutes and 20 seconds to about 7 minutes and 50 seconds to cure the layer of coating.

2. The method of claim 1, wherein:

before the spraying of the solvent-based polyester coating, the solvent-based polyester coating has a viscosity of between about 1 minute and about 6 seconds and about 1 minute and about 16 seconds at about 82° F. (27° C.).

3. The method of claim 1, wherein prior to providing the canister, the canister is formed by extrusion or dye-press.

4. The method of claim 2, further comprising:

adjusting one of a temperature, pressure, or a solvent volume ratio of the solvent-based polyester coating to maintain a viscosity of the solvent-based polyester coating.

5. The method of claim 1, wherein the canister is exposed to the first temperature and the second temperature for a total time of about 11 minutes to about 11 minutes and 30 seconds.

6. The method of claim 1, wherein the solvent comprises dimethyl glutarate and dimethyl succinate.

7. The method of claim 1, further comprising:

inserting a spray gun nozzle through the open end and the neck portion of the canister and into an interior of the canister;

wherein the spraying the layer of the solvent-based polyester coating further comprises:

spraying a first layer of the solvent-based polyester coating onto the interior surface of the base wall of the canister;

spraying a second layer of the solvent-based polyester coating onto an interior surface of the neck portion and at least a portion of the interior surface of the side wall of the canister; and spraying a third layer of the solvent-based polyester coating on an entire interior surface of the canister;

wherein the exposing the canister to the second temperature to cure the solvent-based polyester coating further comprises curing the first, second, and third layers of the solvent-based polyester coating.

8. The method of claim 7, wherein:

the spraying the first layer of the solvent-based polyester coating further comprises spraying the solvent-based polyester coating at a first spray angle;

the spraying the second layer of the solvent-based polyester coating further comprises spraying the solvent-based polyester coating at a second spray angle; and the spraying the third layer of the solvent-based polyester coating further comprises spraying the solvent-based polyester coating at a third spray angle.

9. The method of claim 8, wherein:

at least one of the first spray angle, the second spray angle, and the third spray angle is the same as another of the first spray angle, the second spray angle, and the third spray angle.

10. The method of claim 7, wherein:

before spraying any of the first layer of the solvent-based polyester coating, the second layer of the solvent-based polyester coating, and the third layer of the solvent-based polyester coating, the solvent-based polyester coating has a viscosity of between about 1 minute and 6 seconds and about 1 minute and 16 seconds at about 82° F. (27° C.).

* * * * *